No. 769,607. PATENTED SEPT. 6, 1904.
C. H. HEWER.
MOWING MACHINE.
APPLICATION FILED AUG. 18, 1903.
NO MODEL. 2 SHEETS—SHEET 1.
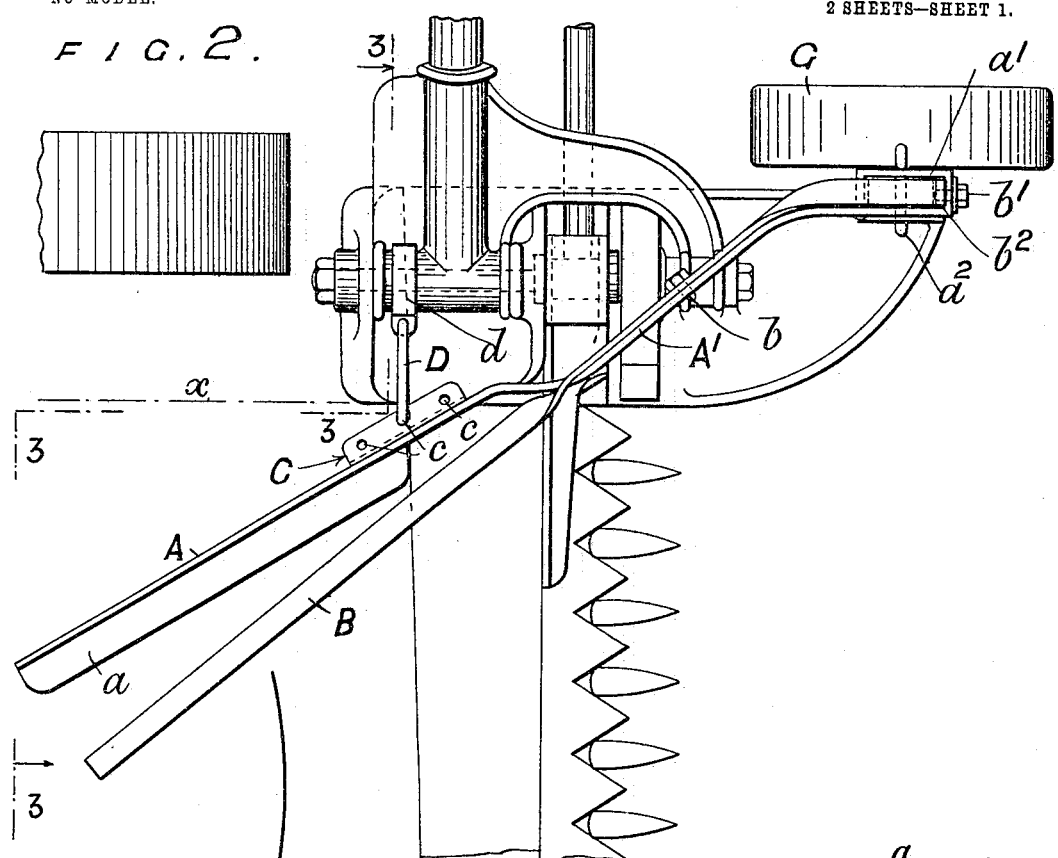
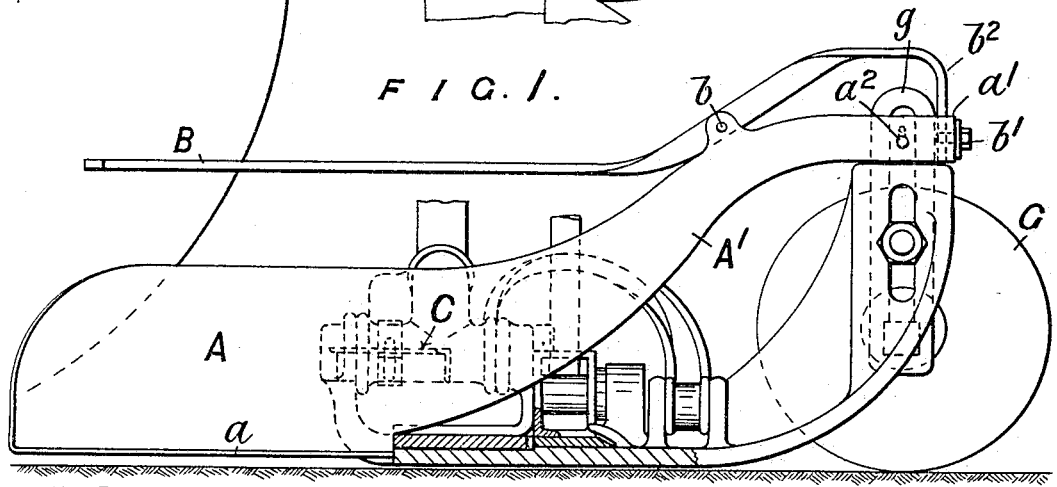
WITNESSES:
W. M. Avery
C. E. Holste
INVENTOR
Charles H. Hewer
BY
ATTORNEYS.

No. 769,607. PATENTED SEPT. 6, 1904.
C. H. HEWER.
MOWING MACHINE.
APPLICATION FILED AUG. 18, 1903.
NO MODEL. 2 SHEETS—SHEET 2.

WITNESSES:
W. M. Avery
C. E. Holske

INVENTOR
Charles H. Hewer
BY
ATTORNEYS.

No. 769,607.

Patented September 6, 1904.

UNITED STATES PATENT OFFICE.

CHARLES HAMBLIN HEWER, OF CRICKLADE, ENGLAND.

MOWING-MACHINE.

SPECIFICATION forming part of Letters Patent No. 769,607, dated September 6, 1904.

Application filed August 18, 1903. Serial No. 169,912. (No model.)

*To all whom it may concern:*

Be it known that I, CHARLES HAMBLIN HEWER, carriage proprietor, a subject of the King of Great Britain, and a resident of High street, Cricklade, in the county of Wilts, England, have invented certain new and useful Improvements in Mowing-Machines, of which the following is a specification.

My invention relates to a track-clearer for mowing-machines designed to clear the cut grass from the standing crop during the first cut around the field or across the standing crop, and thereby dispense with the manual labor usually required to remove this cut swath before the field or piece can be completed, a requirement which often entails great loss of time and crop.

The device of my invention is designed to be applied to the inner end of the finger-bar or that end which is next to the machine-frame and as it is only temporarily required for use may be detachably applied, so as to be readily removable when it has fulfilled its purpose.

Reference is to be had to the accompanying drawings, wherein—

Figure 3:
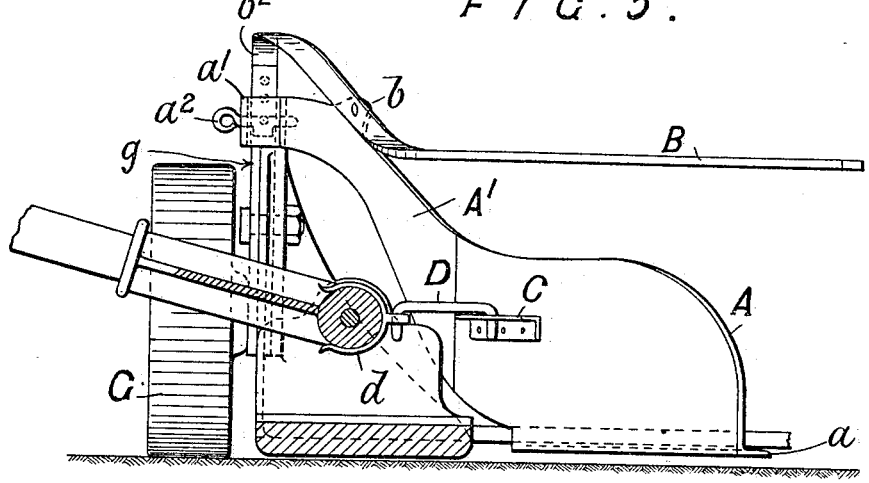
Figure 4:
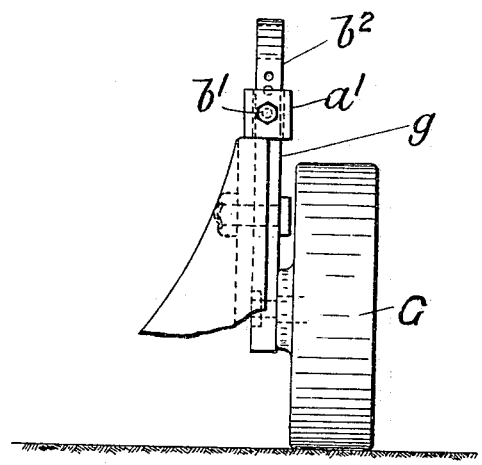

Figure 1 is a side elevation, and Fig. 2 a plan, showing the improved track-clearer and as much of the mowing-machine to which it is applied as is necessary for the comprehension of the invention. Fig. 3 is a section on line 3 3, Fig. 2, looking in the forward direction; and Fig. 4 is an elevation looking rearward of the front end of the reach-frame and part immediately adjacent thereto.

A is the main part of the track-clearer, which may either be made in one piece of iron or of which the rear part may be made of wood, but shod with an iron sole-piece $a$ to protect it from wear in dragging over the stubble of the cut grass. It is attached to a forwardly and upwardly extending reach A', of the form shown in elevation and plan, formed with a socket $a'$ at its forward end or otherwise adapted to be adjustably attached by means of a loose pin $a^2$, preferably to the stalk $g$ of the wheel G, where such is used, or it may be otherwise adjustably attached to any other convenient fixed part of the machine. It is adjustably maintained in a more or less oblique position, preferably, as shown, by means of a strut D, provided with a jaw or spring-clip $d$, adapted to engage with a fixed part of the machine-frame, and with a turned-down rear end adapted to be engaged in one or other of a series of holes $c$ in a rack or bracket C, affixed to the clearer A, whereby to support it in position against pressure due to the resistance of the cut grass and friction on the ground.

The dotted line $x$ indicates the limit of the standing crop from which the cut grass has been separated by the track-clearer A.

B is a rod or arm fulcrumed on the reach-frame A' at $b$, its forward end $b^2$ being adapted to pass over the stalk $g$ of the wheel G and connected to the socket $a'$ by means of a set-screw $b'$, whereby to enable the rearwardly-extending member B to be set higher or lower, as may be required, in order that it shall catch the heads of the grass when falling from the knife in the case of a heavy crop, the obliquity of the said member B being rather greater than that of A, as shown, so as to act in advance thereof.

What I claim is—

In a mowing-machine, a track-clearer for catching the cut grass as it falls and sweeping it clear of the standing crop, consisting in the combination of a board attached at the machine end of the finger-bar so as to extend in rear thereof obliquely across the track of the cutters and angularly adjustable in an approximately horizontal plane, and a rod mounted to extend above and in advance of the top edge of the board and adjustable in an approximately vertical plane, substantially as specified.

CHARLES HAMBLIN HEWER.

Witnesses:
 A. NUTTING,
 FREDK. L. RAND.